United States Patent
Zhang et al.

(10) Patent No.: US 10,252,450 B2
(45) Date of Patent: Apr. 9, 2019

(54) REINFORCED THERMOPLASTIC PRODUCTS AND METHODS OF MAKING THE SAME

(71) Applicant: JOHNS MANVILLE, Denver, CO (US)

(72) Inventors: Mingfu Zhang, Englewood, CO (US); Klaus Friedrich Gleich, Nuremberg (DE); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 154 days.

(21) Appl. No.: 15/227,751

(22) Filed: Aug. 3, 2016

(65) Prior Publication Data

US 2018/0036919 A1   Feb. 8, 2018

(51) Int. Cl.
| | |
|---|---|
| *B29C 41/20* | (2006.01) |
| *B32B 27/14* | (2006.01) |
| *B32B 5/02* | (2006.01) |
| *B29C 41/04* | (2006.01) |
| *B29C 41/00* | (2006.01) |
| *B32B 27/12* | (2006.01) |
| *B29C 70/32* | (2006.01) |
| *B29K 101/12* | (2006.01) |
| *B29K 105/08* | (2006.01) |
| *B29L 23/00* | (2006.01) |

(52) U.S. Cl.
CPC ............ *B29C 41/20* (2013.01); *B29C 41/003* (2013.01); *B29C 41/042* (2013.01); *B29C 70/326* (2013.01); *B32B 5/024* (2013.01); *B32B 27/12* (2013.01); *B29K 2101/12* (2013.01); *B29K 2105/089* (2013.01); *B29L 2023/22* (2013.01)

(58) Field of Classification Search
USPC ........ 156/242; 264/135, 138, 265, 275, 311, 264/311.26
See application file for complete search history.

(56) References Cited

U.S. PATENT DOCUMENTS 3,780,157 A * 12/1973 Hechlhammer et al. ................. B29C 41/003 264/310
4,223,101 A * 9/1980 Fine ...................... D01D 5/0038 264/10

(Continued)

FOREIGN PATENT DOCUMENTS

| EP | 2 030 769 A1 | 3/2009 |
|---|---|---|
| EP | 3 141 576 A2 | 3/2017 |

(Continued)

OTHER PUBLICATIONS

U.S. Appl. No. 14/794,634, filed Jul. 8, 2015.

(Continued)

*Primary Examiner* — Camie S Thompson
(74) *Attorney, Agent, or Firm* — Robert D. Touslee (57) ABSTRACT

A reinforced thermoplastic product may include a main body and a fabric reinforcing sheet that is disposed within a wall of the main body. The wall of the main body may be formed of or from a cast thermoplastic material and the fabric reinforcing sheet may extend circumferentially around the main body in order to reinforce the wall. The fabric reinforcing sheet may include a plurality of fiber bundles and a thermoplastic material that impregnates each fiber bundle.

5 Claims, 4 Drawing Sheets

(56) References Cited

U.S. PATENT DOCUMENTS

| | | | | |
|---|---|---|---|---|
| 5,536,352 A | * | 7/1996 | Zeman | B29C 41/042 |
| | | | | 156/242 |
| 9,186,852 B2 | | 11/2015 | Zhang | |
| 2015/0145165 A1 | | 5/2015 | Zhang | |
| 2016/0046107 A1 | | 2/2016 | Zhang | |

FOREIGN PATENT DOCUMENTS

| | | |
|---|---|---|
| FR | 2 645 070 A3 | 10/1990 |
| WO | 95/00310 | 1/1995 |

OTHER PUBLICATIONS

U.S. Appl. No. 14/845,007, filed Sep. 3, 2015.
U.S. Appl. No. 14/880,307, filed Oct. 12, 2015.
Stuart M Lee, Centrifugal Casting, Dictionary of composites materials technology, Jan. 1, 1989, Technomic, USA.

* cited by examiner

Fig. 7

REINFORCED THERMOPLASTIC PRODUCTS AND METHODS OF MAKING THE SAME

BACKGROUND

The use of fiber-reinforced composites is growing in popularity with applications in transportation, consumer goods, wind energy, and infrastructure. Some of the many reasons for choosing composites over traditional materials such as metals, wood, or non-reinforced plastics include reduced weight, corrosion resistance, and improved mechanical strength. Within the field of fiber-reinforced polymeric composites, thermoplastics are increasingly being used in place of thermosets as the matrix resin due to better durability, recyclability, thermoformability, improved throughput, lower material cost, and lower manufacturing cost.

Thermoplastic liquid molding with low viscosity monomers or oligomers has shown great potential as the technology for the mass production of thermoplastic composites. Compared to traditional thermoset molding of epoxy and polyurethane, thermoplastic liquid molding with monomers or oligomers provides various advantages such as short cycle times and superior properties of the resulting thermoplastic composites, including greater toughness and impact strength, weldability, and recyclability. One example of thermoplastic liquid molding is rotational molding, which is also known as rotomolding or rotational casting.

BRIEF SUMMARY

The embodiments described herein provide reinforced rotationally casted thermoplastic products and methods of forming the same. According to one embodiment, a reinforced thermoplastic product includes a cylindrical shaped main body formed via centrifugal casting a reactive thermoplastic resin within a mold. The reactive thermoplastic resin comprises monomer or oligomer that may polymerize in-situ to form a thermoplastic polymer. The cylindrical shaped main body has a hollow interior and a wall that is formed via polymerization of the reactive thermoplastic resin. The wall has an inner diameter and an outer diameter that define a wall thickness measured radially between the inner and outer diameter. A pre-impregnated fabric reinforcing sheet is positioned within the wall of the cylindrical shaped main body. The pre-impregnated fabric reinforcing sheet extends at least partially along an axial length of the cylindrical shaped main body and extends circumferentially around the cylindrical shaped main body and thereby forms a reinforcing layer within the wall of the cylindrical shaped main body. The pre-impregnated fabric reinforcing sheet includes a plurality of fiber bundles that are oriented along a first direction and a second direction and a polymerized thermoplastic material that is saturated within the pre-impregnated fabric reinforcing sheet so that the polymerized thermoplastic material fully impregnates each fiber bundle of the plurality of fiber bundles. In some instances, the second direction of the fiber bundles has an angled orientation relative to the first direction.

According to another embodiment, a reinforced thermoplastic product includes a main body having a hollow interior and a wall that is formed of a first thermoplastic material and a fabric reinforcing sheet that is disposed within the wall of the main body and that extends circumferentially around the main body to reinforce the wall. The fabric reinforcing sheet includes a plurality of first fiber bundles that are oriented along a first direction and a second thermoplastic material that is disposed within the reinforcing sheet and that impregnates each fiber bundle of the plurality of first fiber bundles.

According to yet another embodiment, a method of reinforcing a thermoplastic product includes positioning a fabric reinforcing sheet within a centrifugal casting mold so that the fabric reinforcing sheet extends longitudinally along at least a portion of the centrifugal casting mold and circumferentially around an axis of the centrifugal casting mold. The method also includes injecting a reactive thermoplastic resin within the centrifugal casting mold so that the reactive thermoplastic resin is centrifugally forced outward within the mold into contact with the fabric reinforcing sheet and an inside wall of the centrifugal casting mold. The method further includes polymerizing the reactive thermoplastic resin so that the reactive thermoplastic resin solidifies with the fabric reinforcing sheet disposed within a cylindrical wall of the thermoplastic product and circumferentially around an axis of the thermoplastic product. The fabric reinforcing sheet typically includes a plurality of first fiber bundles that are oriented along a first direction and a polymerized thermoplastic material that is impregnated within the plurality of fiber bundles.

BRIEF DESCRIPTION OF THE DRAWINGS

The present technology is described in conjunction with the appended figures.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The embodiments described herein relate to thermoplastic prepreg products, and specifically use thermoplastic prepreg products or products that employ such prepregs. In some embodiments, the prepreg products may be fully impregnated with thermoplastic materials. The fully impregnated prepreg products are made using reactive thermoplastic resin materials, specifically monomers or oligomers. In an exemplary embodiment, the reactive thermoplastic resin material may be caprolactam. In other embodiments, the prepreg products may be partially impregnated with the thermoplastic material.

A specific use of the thermoplastic prepregs is rotational or centrifugal casting or molding (hereinafter rotational molding). Rotational molding is a casting technique that is typically used to form cylindrical products. The process may employ various materials such as metal, glass, concrete, and polymer materials. Various thermoplastic and thermoset materials are often used in rotational molding to form various products, including storage tanks, containers, crates, pallets, litter bins, road cones, bollards, floats, buoys, kayaks, canoes, boats, planters, and toys. For example, rotational molding with a liquid caprolactam resin has been used to produce Nylon-6 parts for a wide variety of applications.

Conventional rotationally molded thermoplastic and thermoset materials do not include a fiber reinforcement material, due to the nature of rotational molding process where the liquid resin material is in rotational motion during the molding process. The rotational motion of the resin material renders the fixation of a fiber reinforcement material within a mold extremely difficult, if not impossible. The use of the thermoplastic prepregs herein allows the fiber reinforcement to be positioned within the rotational mold and to maintain an orientation within the mold during the rotational molding process. As such, in contrast to conventional products, the rotationally molded products that are formed by employing the thermoplastic prepregs are reinforced with a fiber material.

In other embodiments, the thermoplastic prepregs may be used in other liquid molding processes that employ thermoplastic materials. For example, resin transfer molding (RTM) processes commonly use caprolactam to produce continuous fiber reinforced Nylon-6 composites for lightweight automotive structures. Caprolactam is often used due to its low viscosity, which enables the liquid resin to thoroughly impregnate continuous fiber reinforcements such as woven fabrics. This type of thermoplastic liquid molding may be used to produce continuous fiber reinforced thermoplastic composites with high fiber contents and relatively complex shapes, which are not attainable with viscous thermoplastic polymer melts.

In thermoplastic liquid molding processes (e.g., RTM), a preforming step is typically needed to form the fiber reinforcement into a net shape prior to resin impregnation. In conventional processes where dry fabrics are employed, it is very challenging to prevent fiber displacement or distortion during resin injection, especially under a high pressure processes such as high pressure RTM (HP-RTM). Often times an additional preforming step is needed to minimize, counteract, or prevent fiber displacement or distortion, such as applying a binder to one or multiple layers of a woven fabric to form the woven fabric, or a portion thereof, into a desired shape. The choice of binders that may be employed, however, is very limited, due to the need for the binder to be compatible with the in-situ polymerized polymer and to not interfere with the in-situ polymerization of the reactive resin material. The number of binders that meet these criteria is very limited.

In addition, the use of binder may also negatively influence resin impregnation because of the coating of fiber reinforcement with the binder material. The thermoplastic prepregs herein provide reinforcement for liquid molded products (e.g., RTM products) while minimizing or ensuring no fiber displacement or distortion. The thermoplastic prepregs also do not interfere with in-situ polymerization and are compatible with the in-situ polymerized polymer.

The thermoplastic prepregs employed herein are "fabric-based" meaning that the prepregs include a fabric reinforcement material, such as those described below. In an exemplary embodiment, the thermoplastic prepregs are fully impregnated with the thermoplastic material, although partially impregnated prepregs may also be used. In some embodiments, these thermoplastic prepregs can be produced through impregnation of the fabric materials with low viscosity monomers or oligomers, followed by in-situ polymerization to form a thermoplastic matrix. Exemplary methods of producing fully impregnated thermoplastic prepregs are further described in U.S. patent application Ser. No. 14/088,034, filed Nov. 22, 2013, entitled "Fiber-Containing Prepregs and Methods and Systems of Making"; U.S. patent application Ser. No. 14/794,634, filed Jul. 8, 2015, entitled "System for Producing a Fully Impregnated Thermoplastic Prepreg"; U.S. patent application Ser. No. 14/845,007, filed Sep. 3, 2015, entitled "System for Producing a Fully Impregnated Thermoplastic Prepreg"; U.S. patent application Ser. No. 14/880,307, filed Oct. 12, 2015, entitled "System for Producing a Fully Impregnated Thermoplastic Prepreg"; and U.S. Pat. No. 9,186,852, entitled "Fiber-Containing Prepregs and Methods and Systems of Making". Each of the above U.S. Patents and U.S. Patent Application are incorporated by reference herein.

In other embodiments, the thermoplastic prepregs can be produced through the use of a thermoplastic polymer powder material that is positioned and impregnated within the fabric, or through the use of a thermoplastic polymer film that is positioned atop the fabric material and impregnated within the fabric under heat and pressure. Exemplary methods of producing such thermoplastic prepregs are further described in U.S. patent application Ser. No. 13/915,023, filed Jun. 11, 2013, entitled "Sized Glass Fibers for Fiber-Containing Composite Articles and Methods of Making Them", the entire disclosure of which is incorporated by reference herein.

Fabric Based Thermoplastic Prepregs

Figure 1:
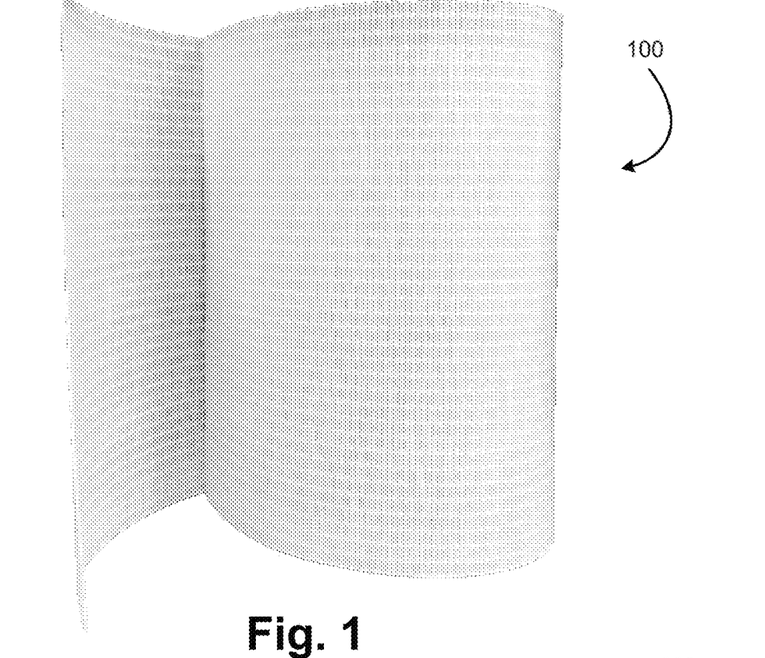
FIG. 1 illustrates a thermoplastic prepreg that may be used in the processes and products described herein.

Referring now to FIG. 1, illustrated is an example of a thermoplastic prepreg 100 that may be used in the various processes described herein. In an exemplary embodiment, the thermoplastic prepreg 100 may be fully impregnated with the thermoplastic material. For example, a nylon-6 prepreg may be produced through the impregnation of a reinforcement fabric with molten caprolactam followed by in-situ polymerization of the caprolactam.

The thermoplastic prepreg 100 (also referred to as a fabric-based thermoplastic prepreg) may include a plurality of fibers, rovings, or fiber bundles (hereinafter fiber bundles or rovings). The rovings may contain continuous glass fibers or other fibers. In some embodiments, the rovings may be woven together. In other embodiments, the rovings may be held together via stitching, or the fibers may be entangled, intermeshed, or formed in a randomly oriented configuration. In embodiments that employ stitching, the stitching threads that are used may be polymeric fibers or other fibers. In yet other embodiments, the rovings may be oriented in a roughly parallel direction. In such embodiments, the thermoplastic prepreg 100 may have a unidirectional fiber orientation.

The term roving or fiber bundle as used herein refers to a bundle of fibers that are positioned adjacent one another to form a rope, thread, or cord like component. A common type of fiber that is used in the rovings is glass fibers, although various other fibers could be used, includes carbon fibers, basalt fibers, metal fibers, ceramic fiber, natural fibers, synthetic organic fibers such as aramid fibers, and other inorganic fibers.

In some embodiments, the rovings may be oriented along a first direction and along a second direction, with the second direction angled relative to the first direction. For example, the second direction may be angled relative to the first direction by 45 degrees, 90 degrees, and the like. The woven materials are materials that are produced by weaving multiple roving strands together. The roving strands are commonly woven so that a first plurality of strands extend in a first direction (e.g., weft direction) and a second plurality of strands extend in a second direction that is typically orthogonal to the first direction (e.g., warp direction). The first plurality of strands are roughly parallel with one another as are the second plurality of strands. Various weaves may be used to form the thermoplastic prepregs 100 described herein, including: plain weaves, twill weaves, satin weaves, multi-axial weaves, or stitching. The thermoplastic prepregs 100 may contain any kind of woven fabric or multi-axial fiber material. In some instances, the thermoplastic prepreg 100 may contain chopped fiber mats. The thermoplastic prepreg 100 may be a hybrid from different types of fibers, including a hybrid of glass fibers and carbon fibers. For ease in describing the embodiments herein, the embodiments will generally refer to the use of glass fibers, although it should be realized that various other fiber types may be used.

The thermoplastic prepreg 100 includes a thermoplastic polymer material that is at least partially saturated or impregnated within the fabric material so that at least some of the fiber bundles are impregnated with the thermoplastic material. In some embodiments, the thermoplastic prepreg 100 may be fully impregnated with the thermoplastic polymer material. For example, thermoplastic prepregs that are manufactured according to the disclosures of the '034, '634, '007, and/or '307 application incorporated by reference herein and/or the '852 patent incorporated by reference herein may be used, which are fully impregnated with a thermoplastic polymer material. In such embodiments, the thermoplastic polymer material fully impregnates each fiber bundle of the thermoplastic prepreg 100.

FIG. 1 illustrates a roll of the thermoplastic prepreg 100. The thermoplastic prepreg 100 may have a high content of reinforcing fibers. When the thermoplastic prepreg 100 is subjected to a heating and/or pressure process, the thermoplastic polymer in the prepreg melts or softens to allow the thermoplastic prepreg to be molded or formed into a composite part and/or to allow the prepreg to be bonded with other thermoplastic materials.

Since the thermoplastic prepreg 100 is based on fabrics (often woven fabrics), the fiber distribution and orientation desired can be pre-built into the fabric design. Accordingly, the thermoplastic prepregs 100 provide significantly higher design freedom and can be used to produce reinforced thermoplastic composite parts that are not attainable through conventional processes. A specific example of this advantage is provided in applications where longitudinal strength is needed. In such applications, the thermoplastic prepreg 100 can be formed from fabrics with a required amount of fibers oriented along a longitudinal, or axial, direction of the desired end product.

An additional benefit is that the sizing of the fibers may be tailored for the in-situ polymerization of reactive monomers or oligomers to impart strong chemical bonding between the reinforcing fibers and the thermoplastic resin matrix. As such, a significant improvement in the composite property can be achieved.

Centrifugal Casting/Rotational Molding

Figure 2:
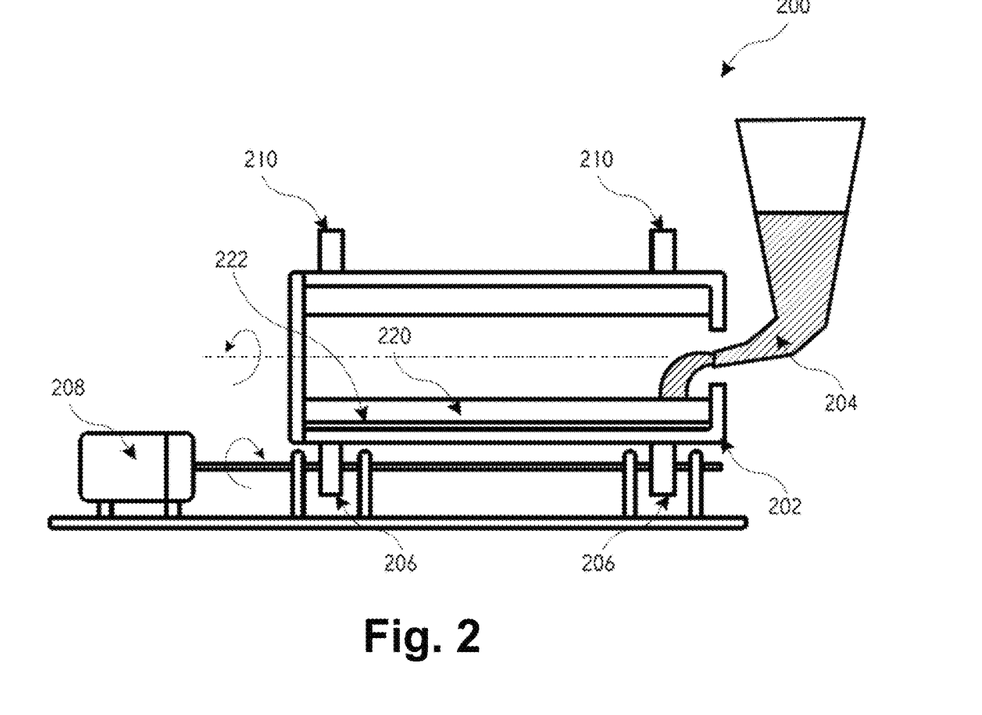
FIG. 2 illustrates an embodiment of a centrifugal casting system.

Referring to FIG. 2, illustrated is an embodiment of a centrifugal casting system 200 where a material, such as a reactive thermoplastic resin material, is spun within a mold 202 and cast radially outward and cured into a shape, such as a pipe or other generally cylindrical object. In addition to the mold 202, the system 200 includes a container 204 or tank within which the resin material is contained. In the instant system, the container may be filled with a reactive thermoplastic resin (e.g., caprolactam). The container 204 is fluidly connected to the mold 202 in order to allow the material to be delivered to an interior of the mold 202. The mold is rotationally mounted within the system 200 and is configured to be rotationally driven via one or more drive mechanism 206, which may include rollers, bearings, gears, and the like. A motor device 208 is used to supply the rotational input to the drive mechanism 206. The system 200 may include one or more additional stabilizer component 210, such as one or more rollers positioned opposite the drive mechanism 206.

The material that is injected into the mold 202 is cast radially outward and into contact with an inner surface of the mold 202 due to centrifugal forces. The material is cured or polymerized within the mold 202 to form the polymerized end product 220. The polymerized end product 220 has an exterior surface that matches or corresponds to the interior surface of the mold 202. Examples of products that are formed via rotational molding or centrifugal casting include: storage tanks, containers, crates, pallets, litter bins, road cones, bollards, floats, buoys, kayaks, canoes, boats, planters, and toys.

A thermoplastic prepreg 222 is positioned within the mold 202 during the casting. The thermoplastic prepreg 222 is positioned within the mold 202 such that the thermoplastic prepreg 222 is disposed within the radial wall of the polymerized end product 220. The thermoplastic prepreg 222 is often disposed within the mold 202 so that the thermoplastic prepreg 222 is adjacent to the inner wall of the mold 202. As such, the thermoplastic prepreg 222 is often disposed at or near the outer wall of the polymerized end product 220. In other instances, the thermoplastic prepreg 222 may be positioned inwardly of the inner wall of the mold 202 so that the thermoplastic prepreg 222 at or adjacent to an inner wall of the polymerized end product 220. The thermoplastic prepreg 222 may be disposed essentially anywhere within the wall of the polymerized end product 220.

Figure 3:
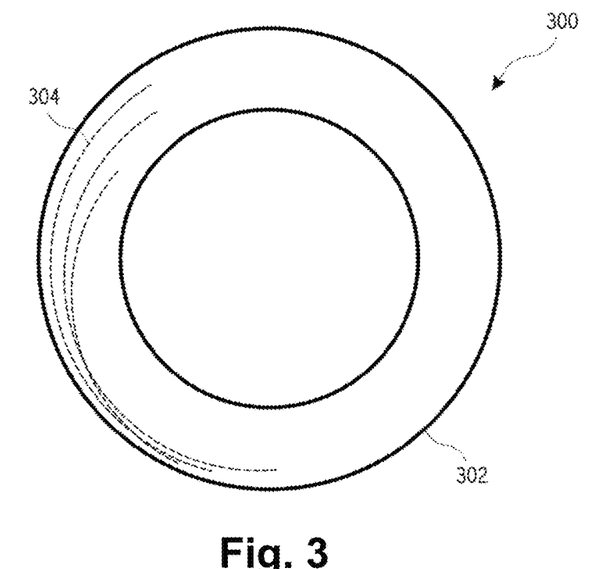
FIG. 3 illustrates a centrifugally casted polymer product formed according to conventional processes.

As illustrated in FIG. 3, in conventional centrifugally casted polymer products 300, a fiber or fabric mat 304 (hereinafter fabric mat 304) cannot be disposed in a desired position within a wall of a casted polymer product 302. This is due to conventional fabric materials being too soft and flexible. Conventional fabric materials are "dry", meaning that the materials are not impregnated by, or otherwise include, a thermoplastic material. Rather, the conventional fabric materials are similar to typical cloth materials that include the woven fibers and essentially nothing else. These materials are not able to remain in position within the mold during the centrifugal casting processes. Rather, these fabric materials bunch up within the mold during the casting processes. As such, when conventional fabric materials are employed in centrifugal casting, the fabric mat 304 is bunched up and/or isolated within the casted polymer product 302. As such, the casted polymer product 302 is not effectively reinforced by the fabric mat 304 and/or the reinforcement is non-uniform.

Figure 4:
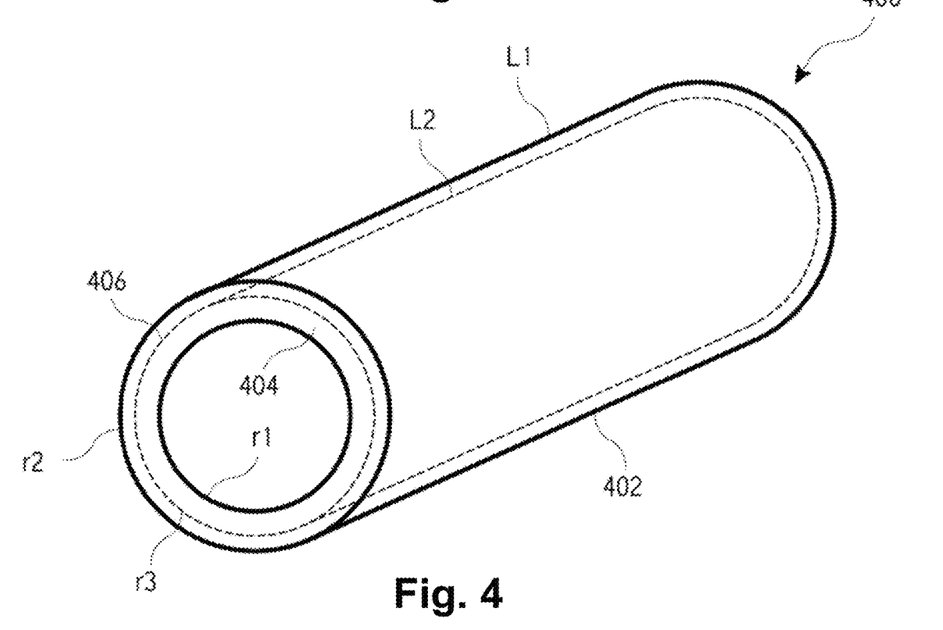
FIG. 4 illustrates an embodiment of a reinforced polymer product formed in accordance with the processes described herein.

Referring now to FIG. 4, illustrated is an embodiment of a reinforced polymer product 400, which may be made of a thermoplastic material. The reinforced polymer product 400 has a cylindrical shaped main body 402 that is formed via centrifugal or rotational casting of a reactive thermoplastic resin within a mold. The cylindrical shaped main body 402 has a hollow interior and a wall 404 that is formed from in-situ polymerization of the reactive thermoplastic resin. The wall 404 has an inner diameter and an outer diameter that define a wall thickness measured radially between the inner and outer diameter. The reactive thermoplastic resin comprises low viscosity pre-polymerized material suitable for the centrifugal casting process. An exemplary type of reactive thermoplastic resin includes materials that are composed mainly of precursor monomers and/or oligomers, such as caprolactam, laurolactam, methyl methacrylate (MMA), cyclic butylene terephthalate (CBT), prepolymer of thermoplastic polyurethane (TPU), cyclic alkenes, and the like.

A fabric reinforcing sheet or thermoplastic prepreg 406 (also referred to herein as a pre-impregnated fabric reinforcing sheet) is positioned within the wall 404 of the cylindrical shaped main body 402. In contrast to the fabric sheet of FIG. 3, the thermoplastic prepreg 406 can be used in the rotational molds because the cured or polymerized thermoplastic material in the prepreg 406 provides rigidity and stiffness that allows the fabric reinforcing sheet to withstand the molding processes. As such, the fabric material does not bunch up within the rotational mold and instead remains relatively uniformly positioned within the rotational mold and within the resulting molded product.

As described herein, the thermoplastic prepreg 406 includes a plurality of fiber bundles. In some instances, the fiber bundles may be oriented along a first direction and a second direction with the second direction having an angled orientation relative to the first direction. In a specific embodiment, the first direction may be aligned with an axis of the cylindrical shaped main body 402 and/or the second direction may be aligned circumferentially around the main body 402. Other fiber orientations are likewise possible including a 30 degree, 45 degree, or 60 degree diagonal orientation of the fibers circumferentially along the main body 402.

Figure 6:
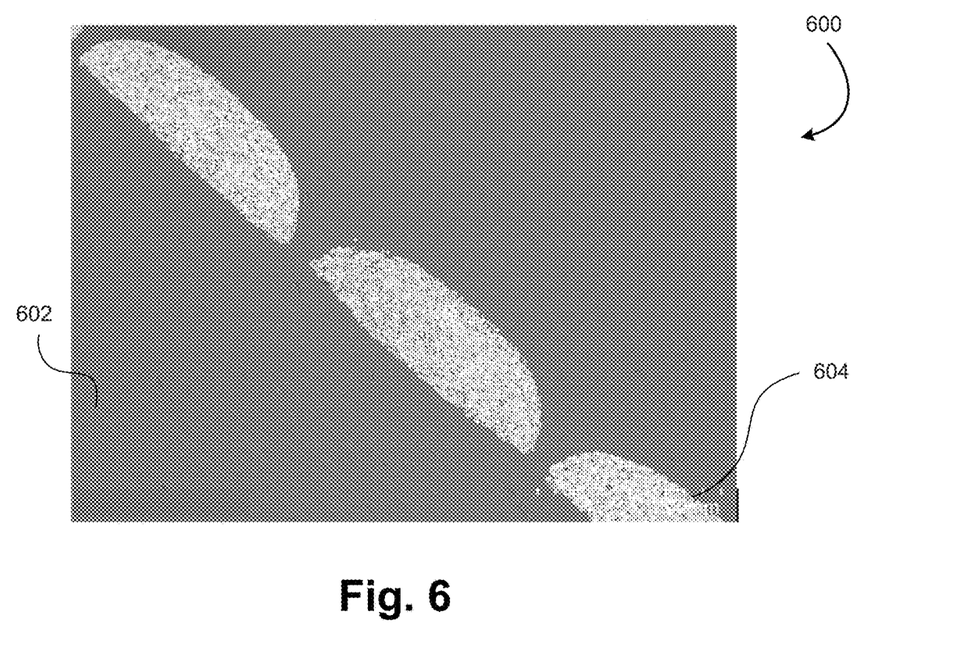
FIG. 6 illustrates a scanning electron microscopy (SEM) image of a centrifugally casted component.

The thermoplastic prepreg 406 also includes a polymerized thermoplastic material that is impregnated within the plurality of fiber bundles. In a specific embodiment, the polymerized thermoplastic material is saturated within the thermoplastic prepreg 406 and fully impregnates each fiber bundle, or most fiber bundles, of the plurality of fiber bundles. For example, FIG. 6 illustrates a scanning electron microscopy (SEM) image of a cross section of a centrifugally casted component 600. The image shows cross-section of fiber bundles in a prepreg 604, or fabric reinforcing sheet, that is seamlessly integrated or disposed within a thick wall 602 of the centrifugally casted component 600. The image illustrates that the fiber bundles of the prepreg 604 are fully impregnated or wetted by the polymerized thermoplastic material. Stated differently, the image demonstrates that the prepreg 604 is substantially free of "dry fibers", or fibers that are not wetted or impregnated by the thermoplastic material.

In other embodiments, the thermoplastic material may partially impregnate the plurality of fiber bundles. In some embodiments, the process of polymerizing the reactive thermoplastic resin may be performed at a temperature which is below the melting temperature of the polymerized thermoplastic material in the prepreg. For example, the anionic polymerization of caprolactam can be carried out at a temperature below the melting point of polyamide-6. In such instances, the caprolactam will polymerize without causing melting of the polyamide-6, which is coated on, and impregnated within, the fiber bundles in a polyamide-6 prepreg. Therefore the rigidity of the thermoplastic prepreg is kept during the centrifugal casting, and the prepreg will not be bunched up like the conventional fabrics.

Figure 5:
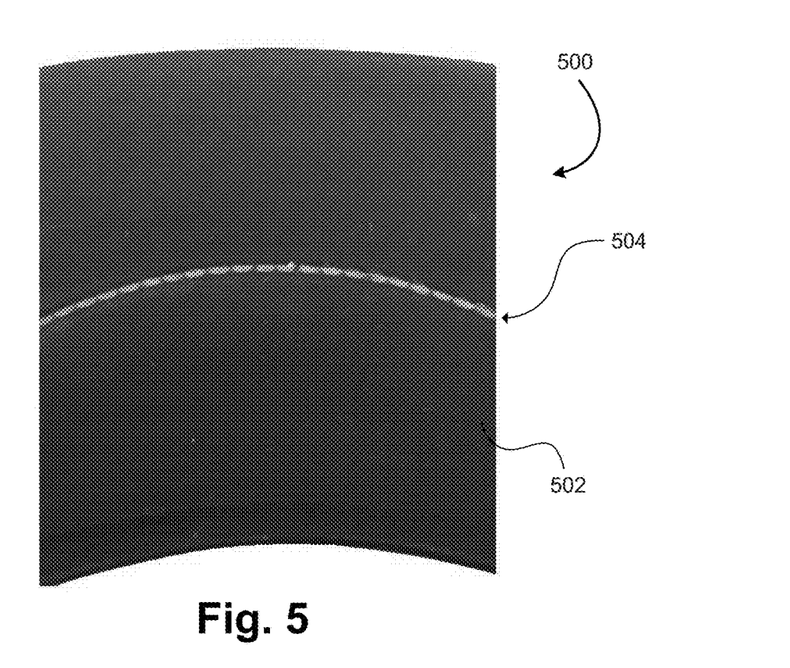
FIG. 5 illustrates a cross sectional image of a centrifugally casted component including a thermoplastic prepreg disposed within a wall of the casted component.

Even though the reactive thermoplastic resin may not impregnate the fiber bundles in the thermoplastic prepreg, a seamless bond is created between the polymerized thermoplastic material of the prepreg 406 and the polymerized reactive thermoplastic resin that is used in the centrifugal casting process. The seamless bonding is typically due to the use of the same thermoplastic resin in the prepreg 406 and centrifugal casting. For example, FIG. 5 illustrates a cross sectional image of a centrifugally casted component 500 that includes a thick wall 502 and a prepreg 504 or fabric reinforcing sheet. The image demonstrates that the centrifugally casted component 500 is free of an interface between the pregreg's polymerized thermoplastic material and the component wall's polymerized reactive thermoplastic resin that is centrifugally casted into contact with the prepreg 504. Rather, a seamless transition occurs between these two polymerize materials, which demonstrates the effective bonding of the materials. In contrast to the embodiments herein, the formation of an interface or boundary represents an area where the two materials may delaminate.

The thermoplastic prepreg 406 extends at least partially along an axial or longitudinal length of the cylindrical shaped main body 402 and also extends circumferentially around the cylindrical shaped main body 402. The thermoplastic prepreg 406 typically extends fully or entirely circumferentially around the main body 402 as illustrated, although in some instances the thermoplastic prepreg 406 may extend only partially around the main body 402 depending on the required application, or any other reason. The thermoplastic prepreg 406 forms a reinforcing layer of fabric or fiber material within the wall 404 of the cylindrical shaped main body 402.

As illustrated in FIG. 4, there is no significant bunching of the thermoplastic prepreg 406 (i.e., fabric reinforcing sheet) within the wall 404 of the cylindrical shaped main body 402. For example, in contrast to FIG. 3, the thermoplastic prepreg 406 does not include folded sections within the wall 404 and/or around the periphery of the main body 402. In some instances, a single layer of the thermoplastic prepreg 406 may be disposed within the wall 404 of the cylindrical shaped main body 402 while in other instances, the multiple layers of the thermoplastic prepreg 406 may be disposed within the wall 404.

As illustrated in FIG. 4, the thermoplastic prepreg 406 may be disposed substantially or roughly concentrically within the wall 404 of the main body 402. Stated differently, an axis of the thermoplastic prepreg 406 may be aligned or concentric with an axis of the main body 402. In other instances, the thermoplastic prepreg 406 may be disposed within the wall so as to have a non-concentric arrangement.

The thermoplastic prepreg 406 may also be disposed radially inward from the outer wall or surface of the cylindrical shaped main body 402. Specifically, the wall 404 has an inner wall or surface that is defined by a first radius $r_1$ and an outer wall or surface that is defined by a second radius $r_2$. The thermoplastic prepreg 406 is disposed within the wall 404 and has a radius $r_3$. The radius $r_3$ of the thermoplastic prepreg 406 may be equivalent with either $r_1$ or $r_2$, such that the thermoplastic prepreg 406 is essentially disposed on the inner or outer surface of the main body 402, respectively, or the radius $r_3$ may be between $r_1$ or $r_2$ so that the thermoplastic prepreg 406 is disposed within the wall 404 between the inner and outer wall surfaces.

In some instances, the thermoplastic prepreg 406 is positioned within the wall 404 so that the thermoplastic prepreg 406 is axially shorter than a length of the cylindrical shaped main body 402. For example, the main body 402 may have an axial or longitudinal length L1, and the thermoplastic prepreg 406 may have an axial or longitudinal length L2 that is shorter than the length L1 of the main body 402. Because the thermoplastic prepreg's length L2 is shorter than the main body's length L1, the thermoplastic prepreg 406 is disposed within the main body 402 so that at least one axial end or edge of the thermoplastic prepreg 406 is positioned axially inward of an axial end or edge of the main body 402. In some embodiments, both axial ends of the thermoplastic prepreg 406 are positioned axially inward of the respective axial ends of the main body 402.

This axial shorter arrangement of the thermoplastic prepreg 406 is achieved by positioning the thermoplastic prepreg 406 within the rotational mold with one or both axial ends of the thermoplastic prepreg 406 positioned axially inward of the axial ends of the mold. Stated differently, the thermoplastic prepreg 406 may be positioned within the mold so that a gap or clearance exists between one or more lateral edges of the prepreg component and the mold. This axial shorter configuration may aid in forming the reinforced polymer product 400 by allowing the resin material to flow axially around the thermoplastic prepreg 406. For example, the thermoplastic prepreg 406 may function as a barrier that impedes or prevents the radial flow or movement of the resin material within the mold. With the thermoplastic prepreg 406 positioned within the mold so that one or both axial ends are axially inward of the mold ends, the resin material is able to flow around the axial ends of the thermoplastic prepreg 406 and behind the thermoplastic prepreg 406.

In some embodiments, the thermoplastic prepreg 406 may include one or more sections that aid in the radial flow of the resin material within the mold. For example, the thermoplastic prepreg 406 may include one or more holes (not shown) that allow the resin material to flow through the thermoplastic prepreg 406 during rotational molding. In embodiments that employ sections that aid in radial flow of the the resin material through the thermoplastic prepreg 406, the thermoplastic prepreg 406 may be positioned within the mold and the resulting reinforced polymer product 400 with the opposing axial ends roughly aligned with the opposing ends of the mold and the resulting reinforced polymer product 400.

Although the main body 402 is illustrated in FIG. 4 as having a smooth cylindrical inner and/or outer wall configuration, it should be realized that in many embodiments the inner and/or outer wall of the main body 402 will include various non-cylindrical or smooth configurations. For example, the inner and/or outer wall may include various projections, teeth, flanges, ribs, recesses, and the like. In addition, the opposing axial ends of the main body 402 may include flanges, ribs, teeth, and the like that aid in coupling adjacent sections of tubing and/or serve various other purposes.

In an exemplary embodiment, a fully-impregnated polyamide-6 prepreg may be used as a reinforcement component in a caprolactam rotational molding process. The resulting product is a reinforced polyamide-6 part. In a liquid molding process with caprolactam, the molding temperature is typically the polymerization temperature of caprolactam (e.g., 160° C.), which is well below the melting temperature of the polyamide-6 material in the prepreg. As a result, the net shape of the prepreg is preserved during the molding process, which ensures that the desired fiber orientation and fiber distribution in the molded parts is maintained.

The full impregnation of the reinforcing fibers in the polyamide-6 prepreg also eliminates the need for additional resin impregnation during the molding process. The full impregnation of the thermoplastic prepreg further ensures the molded part is free of, or otherwise does not include, dry fibers (i.e., fibers which are not wetted or contacted by the thermoplastic material), which may cause degradation in mechanical properties of the molded part. An additional advantage of using polyamide-6 prepreg as the reinforcement for thermoplastic liquid molding of caprolactam is the seamless integration of polyamide-6 in the prepreg and the in-situ polymerized polyamide-6 from liquid molding as illustrated in FIG. 6.

Resin Transfer Molding

In some embodiments, a fully impregnated thermoplastic prepreg can be positioned inside a mold prior to injection of a reactive thermoplastic resin within the mold, such as in a resin transfer molding (RTM) process. The use of the thermoplastic prepreg provides several advantages over conventional fabric reinforcement. For example, the thermoplastic prepreg may be formed into rather complex three dimensional shapes and inserted into a mold for injection of reactive thermoplastic resin onto the prepreg. The additionally injected resin may form additional and/or more complex shapes, and/or may increase the thickness of the polymer material in the product. The thermoplastic prepreg also provides structural integrity to the fiber bundles to ensure that the fibers do not displace during injection of the resin. The non-displacement of the fibers during injection ensures that the final product is properly reinforced in desired and/or critical areas.

Forming conventional fabric sheets (i.e., fabric sheets that do not include an impregnated thermoplastic material) into complex three dimensional shapes for a subsequent resin injection process is difficult due to the flexibility of the fabric material and due to the ability of the individual fibers to move or displace during injection of the resin. For example, a common problem associated with RTM products is that the fabric material experiences fiber displacement during resin injection. Specifically, since the resin is injected under pressure, the pressurized resin causes the fibers to move or displace outwardly from the injection point. The displacement of the fibers may create areas of weakness or non-uniformity within the resulting product.

To counter this problem, a binder material may be employed on the fabric material to pre-form the fabric material into a net shape. The binder adheres to the fiber bundles together and functions to hold or maintain the fiber bundles in position during injection of the resin. This solution, however, results in various other issues or problems. For instance, when caprolactam is used as the reactive thermoplastic resin, the extreme sensitivity of the anionic polymerization of caprolactam to environmental conditions may result in incomplete polymerization of the caprolactam if an incompatible binder is used. As a result, the use of caprolactam greatly reduces the choices of binder materials that may be employed to adhere the fiber bundles together. In addition, the use of the binder material may form a weak interface or boundary between the binder material and the polymerized resin. The formed product is typically weakest where such interfaces or boundaries are formed.

The thermoplastic prepregs described herein eliminate these problems associated with resin injection processes. For example, the polymerized resin in the thermoplastic prepregs functions to maintain the fiber bundles in position during the injection of the resin, thereby eliminating the need to use binder materials in the reinforcing fabrics. The polymerized resin of the thermoplastic prepregs prevents fiber displacement during the injection process, especially in instances where the resin is injected and polymerized below the melting temperature of the prepreg's thermoplastic material.

In addition, the polymerized resin of the thermoplastic prepreg may be the same as the polymerized resin formed from the reactive thermoplastic resin that is injected into the mold. Since the thermoplastic materials are of the same nature, an interface or boundary between the two materials is not formed as illustrated in FIGS. 5 and 6. In some instances, the injected reactive thermoplastic resin may soften or partially melt the prepreg's thermoplastic material. In such instances, the injected reactive thermoplastic resin may mix and/or bond with the thermoplastic material of the prepreg.

The embodiments described herein may find particular usefulness in RTM processes that involve a preformed component having a desired shape. For example, a sheet of the thermoplastic prepreg may be thermoformed into a desired shape, such as an oil pan. The thermoformed prepreg may then be positioned within an RTM mold and a reactive thermoplastic resin may be injected onto the thermoformed prepreg. The resulting product is a fiber reinforced RTM product having improved strength and uniformity due to elimination of fiber displacement, weak interfaces, and the like. The thermoformed prepreg may form a portion of the entire final RTM product.

Exemplary Methods

Figure 7:
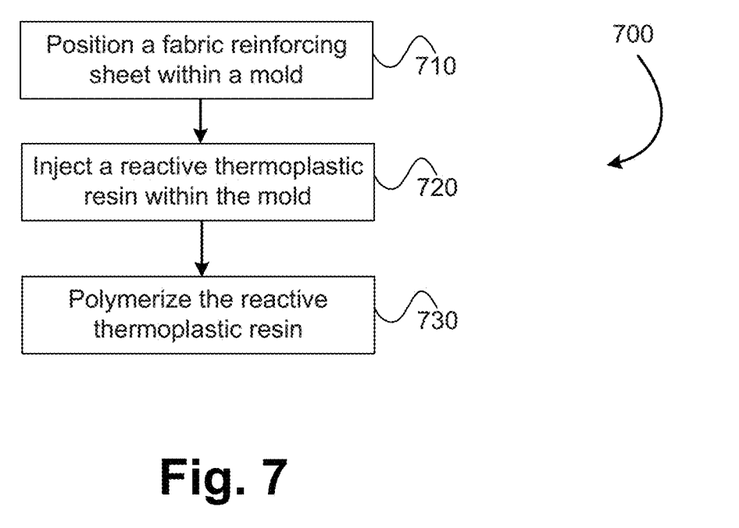
FIG. 7 illustrates a method of reinforcing a thermoplastic product.

Referring now to FIG. 7, illustrated is a method 700 of reinforcing a thermoplastic product. At block 710, a fabric reinforcing sheet is positioned within a mold. In some instances, the mold may be a mold associated with a resin injection process, such as a mold used in resin transfer molding. In other instances, the mold may be a centrifugal casting mold. In the centrifugal casting example, the fabric reinforcing sheet may be positioned within the mold so that the fabric reinforcing sheet extends longitudinally along at least a portion of the centrifugal casting mold and circumferentially around an axis of the centrifugal casting mold.

In either instance, the fabric reinforcing sheet may include a plurality of first fiber bundles that are oriented along a first direction and a polymerized thermoplastic material that is partially or fully impregnated within the plurality of fiber bundles. In some instances, the fabric reinforcing sheet may also include a plurality of second fiber bundles that are oriented along a second direction having an angled orientation relative to the first direction. The polymerized thermoplastic material may be partially or fully impregnated within the plurality of second fiber bundles.

At block 720, a reactive thermoplastic resin is injected within the mold. In the resin injection embodiments, the reactive thermoplastic resin may be injected atop the fabric reinforcing sheet. In the centrifugal casting embodiments, the reactive thermoplastic resin may be injected so that the reactive thermoplastic resin is centrifugally forced outward within the mold into contact with the fabric reinforcing sheet and an inside wall of the centrifugal casting mold. In either embodiment, the reactive thermoplastic resin may include caprolactam, laurolactam, methyl methacrylate (MMA), cyclic butylene terephthalate (CBT), prepolymer of thermoplastic polyurethane (TPU), cyclic alkenes, or some combination thereof.

At block 730, the reactive thermoplastic resin is in-situ polymerized so that the polymerized reactive thermoplastic resin solidifies within the mold. In the centrifugal casting embodiments, the polymerized reactive thermoplastic resin is solidified with the fabric reinforcing sheet disposed within a cylindrical wall of the thermoplastic product and circumferentially around an axis of the thermoplastic product. In either embodiment, the polymerization of the reactive thermoplastic resin may be performed at a temperature below the melting point of the fabric reinforcing sheet's thermoplastic material. For example, the anionic polymerization of caprolactam can be carried out at a temperature below the melting point of polyamide-6. As such, the fabric reinforcing sheet's thermoplastic material may experience minimal or no substantial softening or melting of the thermoplastic material.

In the centrifugal casting embodiments, the fabric reinforcing sheet may be positioned within the centrifugal casting mold so that a gap exists between opposing axial ends of the fabric reinforcing sheet and opposing axial ends of the centrifugal casting mold. The gap may enable flow of the reactive thermoplastic resin around the opposing axial ends of the fabric reinforcing sheet. The fabric reinforcing sheet may also be disposed radially inward from an outer wall of the thermoplastic product.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of reinforcing a thermoplastic product comprising:
   positioning a fabric reinforcing sheet within a centrifugal casting mold so that the fabric reinforcing sheet extends longitudinally along at least a portion of the centrifugal casting mold and circumferentially around an axis of the centrifugal casting mold, the fabric reinforcing sheet including:
      a plurality of first fiber bundles that are oriented along a first direction; and
      a polymerized thermoplastic material that is impregnated within the plurality of fiber bundles;
   injecting a reactive thermoplastic resin within the centrifugal casting mold so that the reactive thermoplastic resin is centrifugally forced outward within the mold into contact with the fabric reinforcing sheet and an inside wall of the centrifugal casting mold; and
   polymerizing the reactive thermoplastic resin so that the polymerized reactive thermoplastic resin solidifies with the fabric reinforcing sheet disposed within a wall of the thermoplastic product and circumferentially around an axis of the thermoplastic product.

2. The method of claim 1, wherein the fabric reinforcing sheet is positioned within the centrifugal casting mold so that a gap exists between opposing axial ends of the fabric reinforcing sheet and opposing axial ends of the centrifugal casting mold, the gap enabling flow of the reactive thermoplastic resin around the opposing axial ends of the fabric reinforcing sheet.

3. The method of claim 1, wherein the reactive thermoplastic resin comprises caprolactam, laurolactam, methyl methacrylate (MMA), cyclic butylene terephthalate (CBT), prepolymer of thermoplastic polyurethane (TPU), or cyclic alkenes.

4. The method of claim 1, wherein the fabric reinforcing sheet is disposed radially inward from an outer wall of the thermoplastic product.

5. The method of claim 1, wherein the fabric reinforcing sheet further comprises a plurality of second fiber bundles that are oriented along a second direction having an angled orientation relative to the first direction, and wherein the polymerized thermoplastic material is impregnated within the plurality of second fiber bundles.

* * * * *